United States Patent
Panchagnula et al.

(10) Patent No.: US 11,082,366 B2
(45) Date of Patent: *Aug. 3, 2021

(54) METHOD AND APPARATUS FOR USING MULTIPLE LINKED MEMORY LISTS

(71) Applicant: Marvell Asia Pte, Ltd., Singapore (SG)

(72) Inventors: Vamsi Panchagnula, San Jose, CA (US); Saurin Patel, San Jose, CA (US); Keqin Han, Fremont, CA (US); Tsahi Daniel, Palo Alto, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 127 days.

This patent is subject to a terminal disclaimer.

(21) Appl. No.: 16/594,962

(22) Filed: Oct. 7, 2019

(65) Prior Publication Data
US 2020/0044989 A1 Feb. 6, 2020

Related U.S. Application Data

(63) Continuation of application No. 14/675,450, filed on Mar. 31, 2015, now Pat. No. 10,484,311.

(51) Int. Cl.
*H04L 12/861* (2013.01)
*H04L 12/863* (2013.01)
(Continued)

(52) U.S. Cl.
CPC ...... *H04L 49/9005* (2013.01); *H04L 47/6225* (2013.01); *H04L 49/90* (2013.01); *H04L 49/901* (2013.01); *H04L 49/9015* (2013.01)

(58) Field of Classification Search
CPC ............. H04L 49/9015; H04L 49/9005
See application file for complete search history.

(56) References Cited

U.S. PATENT DOCUMENTS 7,627,870 B1   12/2009   Michaeli et al.
7,796,627 B2   9/2010    Hurley et al.
(Continued)

FOREIGN PATENT DOCUMENTS

CN    103222242       7/2013
JP    2000236334 A    8/2000
(Continued)

OTHER PUBLICATIONS

Clock Cycle (computerhope.com, Feb. 9, 2014).

*Primary Examiner* — Nicholas P Celani

(57) ABSTRACT

An apparatus and method for queuing data to a memory buffer. The method includes selecting a queue from a plurality of queues; receiving a token of data from the selected queue and requesting, by a queue module, addresses and pointers from a buffer manager for addresses allocated by the buffer manager for storing the token of data. Subsequently, a memory list is accessed by the buffer manager and addresses and pointers are generated to allocated addresses in the memory list which comprises a plurality of linked memory lists for additional address allocation. The method further includes writing into the accessed memory list the pointers for the allocated address where the pointers link together allocated addresses; and migrating to other memory lists for additional address allocations upon receipt of subsequent tokens of data from the queue; and generating additional pointers linking together the allocated addresses in the other memory lists.

20 Claims, 10 Drawing Sheets

(51) Int. Cl.
  *H04L 12/883* (2013.01)
  *H04L 12/879* (2013.01)

(56) References Cited

U.S. PATENT DOCUMENTS

| | | | |
|---|---|---|---|
| 10,484,311 B2 * | 11/2019 | Panchagnula | ....... H04L 49/9005 |
| 2005/0008011 A1 | 1/2005 | Georgiou et al. | |
| 2009/0257441 A1 | 10/2009 | Hata et al. | |
| 2011/0016284 A1 | 1/2011 | Balan et al. | |
| 2012/0127860 A1 | 5/2012 | Arumilli et al. | |
| 2015/0124833 A1 * | 5/2015 | Ma | ........................... G06F 5/16 |
| | | | 370/412 |

FOREIGN PATENT DOCUMENTS

| JP | 2009260535 A | 11/2009 |
|---|---|---|
| JP | 2011254149 A | 12/2011 |

* cited by examiner

METHOD AND APPARATUS FOR USING MULTIPLE LINKED MEMORY LISTS

RELATED U.S. APPLICATION

This application is a continuation of the application with Ser. No. 14/675,450, entitled "Method And Apparatus For Using Multiple Linked Memory Lists," by V. Panchagnula et al., filed Mar. 31, 2015, and hereby incorporated by reference in its entirety.

TECHNICAL FIELD

The present disclosure relates generally to the field of network data transmission, and, more particularly, to systems and methods for linking multiple memory lists during dequeuing and enqueuing tokens of data from selected queues in order to increase the throughput of a switching networking when transmitting tokens of data.

BACKGROUND

In a data switching network, data traffic is categorized into various flows which are stored in a number of queues in a buffer. In a router or other network element, the stored queues typically compete for a common outgoing communications link or egress port (e.g., a physical communications link or a pseudo-wire). Thus, the buffered queues need to be scheduled on the egress side. Accordingly, processing is required by token scheduling devices on the egress side in the router prior to transmission, performed to select which of the queued packets will be the next in line for outgoing transmission.

Typically, in a routing process, tokens of data coming from different source ports are classified based on their source and destination ports, and traffic types. They are subsequently sorted into different queues in the buffer. The tokens of data that pass through a router network and/or are processed by a router network are maintained, at least temporarily, in a buffer memory. Typically, a memory data structure known as a linked list queue is maintained in association with the buffer memory. A linked list queue contains a list of pointers respectively pointing to each memory location in the buffer memory in which data associated with each token is stored. A conventional queue structure typically stores, in one continuous, sequential list, each pointer associated with each token of data that is currently stored in the buffer memory. The state of each queue is updated and related link-list pointers are updated when a token of data enters into the queue. Based on the output port availability, the scheduler selects a scheduling algorithm to dequeue the tokens of data from the queues. The state of each queue and linked list pointers will be then be updated again when a token of data moves out of a queue.

Additional latency time is incurred in the processing of multicast traffic data packets as steps of classifying tokens of data are required and are based on the source and destination ports and traffic types. Initially, the tokens of data associated with the data packets are sorted into different queues and then upon entry into a queue, the state of the queue is updated. Next, based on port availability, a scheduler selects a scheduling algorithm to dequeue the tokens from corresponding queues in the buffer memory. This step of waiting for port availability has to be repeated for each of the tokens of data to be sent. Also, Quality of Service (QoS) algorithmic checks are required if copies of the tokens of data are required to be replicated and sent to additional ports. Further, sometimes additional checks are necessary when transmitting the tokens of data when guarantee of preferential service is needed for, as an example, high priority traffic, such as control traffic or voice/video latency sensitive traffic. Such checks can generate additional latency time during transmission.

The buffer manager's performance is limited by the pipeline flow of the tokens of data in the enqueue and dequeue processing operations. When the buffer is full, the buffer manager must wait until a token of data is dequeued before enqueuing additional tokens of data. In order to reduce the latency time here, parallel buffers are introduced to enable additional tokens of data to be enqueued. However, such additional parallel buffers use additional resources and processing power. Additionally, each time the buffer memory is to be processed in some operation performed by the router, the queue must be accessed or addressed such that the pointer associated with that token of data is obtained.

As processing speeds associated with routers or other packet switches increase (e.g., 10 gigabits per second and faster), the input and output bandwidth and access latency associated with the memory used to maintain the queue become critical. That is, given the fact that a conventional queue must be accessed each and every time a token pointer is needed, the queue memory can become a significant bottleneck.

SUMMARY OF THE DISCLOSURE

Therefore, it would be advantageous to provide a buffer memory management using address link-lists which enables increases of the present limited number of enqueue and dequeue operations that can be perforated in current devices by using virtual queue techniques based upon link-lists that offer multiple enqueuing and dequeuing token buffer operations.

Embodiments of the present disclosure provide mechanisms for forming a link-list of virtual queues using multiple list type sub-queues where the implementation of the sub-queue lists makes it possible to schedule in parallel multiple tokens of data for transmission, significantly increasing the throughput of the switching mechanisms in the router.

Accordingly, one embodiment of the present disclosure employs methods of queuing data to a memory buffer, the method comprises selecting a queue from a plurality of queues and receiving a token of data from the selected queue. A queue module requests addresses and pointers from a buffer manager for addresses to be allocated by the buffer manager for storing the token of data. Then, a memory list is accessed by the buffer manager and addresses and pointers are generated to allocated addresses in the memory list. An accessed memory list comprises a plurality of linked memory lists for additional address allocation. Further, the accessed memory list is written into the pointers for the allocated address. The pointers link together allocated addresses. The method further includes migrating to other memory lists for additional address allocations upon receipt of subsequent tokens of data from the queue and generating additional pointers linking together the allocated addresses in the other memory lists.

According to another embodiment of the present disclosure for queuing data to a memory buffer, the apparatus comprises a selector module for selecting a queue from a plurality of queues and receiving a token of data from the selected queue. A manager responsive to the module for requests of addresses and pointers for addresses being allocated by the manager for storing the token of data. An allocation module responsive to the manager to access a memory list and generate addresses and pointers to allocate addresses in the memory list. The accessed memory list comprises a plurality of linked memory lists for additional address allocation. The allocation module writes into the accessed memory list the pointers for the allocated address where the pointers link together allocated addresses, and then migrates to other memory lists for additional address allocations upon receipt of subsequent tokens of data from the queue and generates additional pointers linking together the allocated addresses in the other memory lists.

According to yet another embodiment of the present disclosure, the queue module comprises an enqueue module for enqueuing tokens of data into allocated addresses of the linked memory lists and a dequeue module for dequeuing tokens of data from allocated addresses of the linked memory lists. The enqueue module is configured to generate requests to the buffer manager for enqueuing a plurality of tokens of data at once where the plurality of tokens of data have addresses linked by pointers across the plurality of memory lists. The dequeue module is configured to generate requests to the buffer manager for dequeuing a plurality of tokens of data at once where the plurality of tokens of data have addresses linked by pointers across the plurality of memory lists.

This summary contains, by necessity, simplifications, generalizations and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of the present disclosure will be better understood from a reading of the following detailed description, taken in conjunction with the accompanying drawing figures in which like reference characters designate like elements and in which.

DETAILED DESCRIPTION

Figure 1:
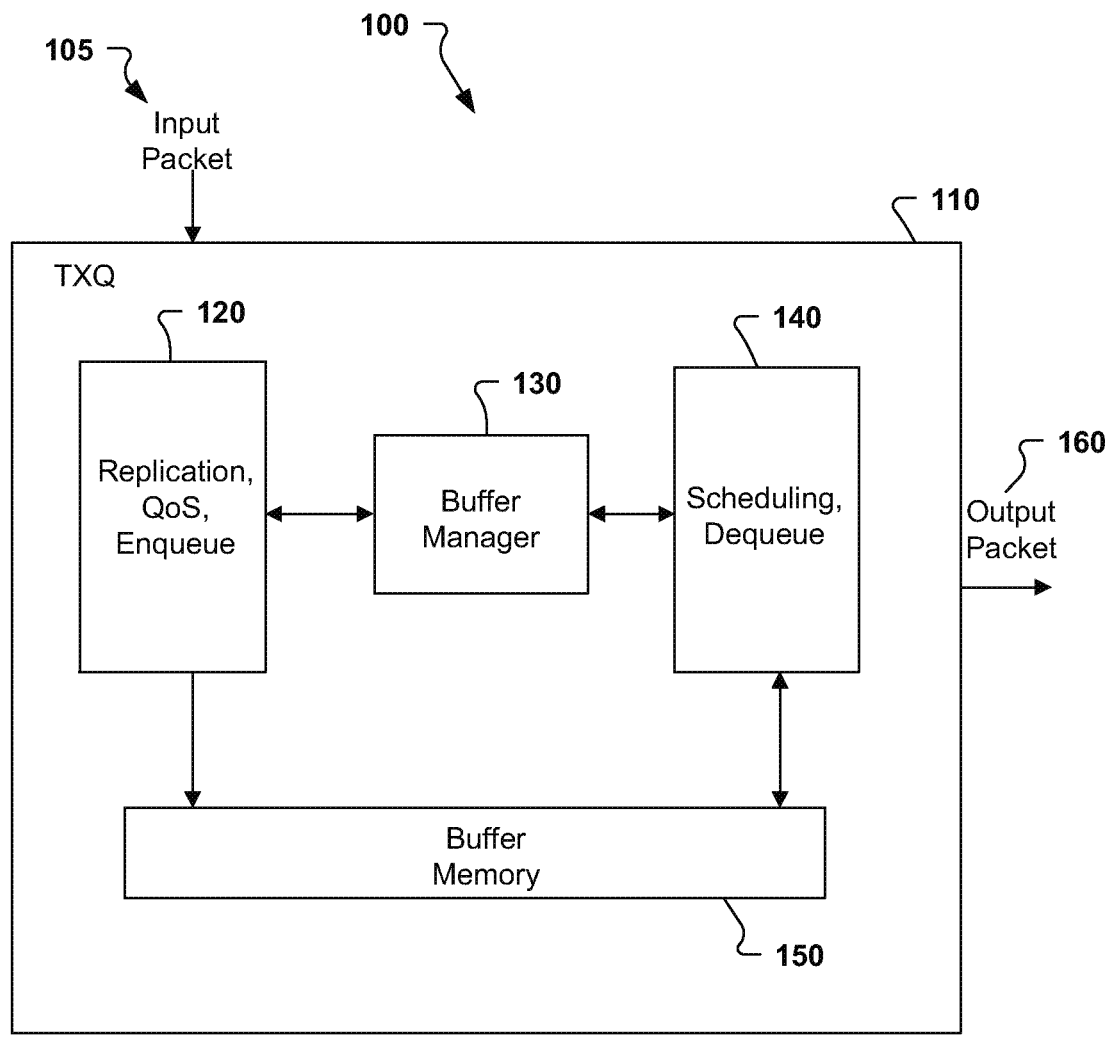
FIG. 1 is a block diagram depicting a configuration of the buffer manager modules in an exemplary router, in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing teens such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment, Enqueue and Dequeue Buffer Memory Management FIG. 1 shows a token of data processing system 100 in which the present disclosure may be implemented. The system 100 includes a processor 110 with replication, QOS and enqueue processors 120, a buffer manager 130, a scheduling dequeue 140 and a buffer memory 150. The processor 110 is configured to provide an interface between a network from which tokens of data and other tokens of data are received and to an output port 160 controlled by the scheduling dequeue 140. The processor 110 with replication, QOS and enqueue processors 120, a buffer manager 130, a scheduling dequeue 140 and a buffer memory 150 may be implemented, e.g., as one or more integrated circuits installed on a line or port card of a router or switch. The tokens of data can be considered but are not limited to representative portions of the packet data to be transmitted. As an example, a packet of data can have both a payload portion and header portion. The token of data would generally encompass the header portion of a data packet or a collection of meta-data or aspects associated with header portion or associated with the entire data packet. Additionally, if the header portion is between 64 to 128 bits, the token of data required may be 40-50 bits depending on network requirements. The token of data can be associated to the data packet by pointers and the data packets can be stored in external memory blocks referenced to by associated pointers that are coupled to the tokens of data.

It should be understood that the particular arrangement of system elements shown in FIG. 1 is by way of illustrative example only. More particularly, as previously noted, the present disclosure can be implemented in accordance with any type of packet or token processor, and is not limited to any particular packet processing application.

Figure 2:
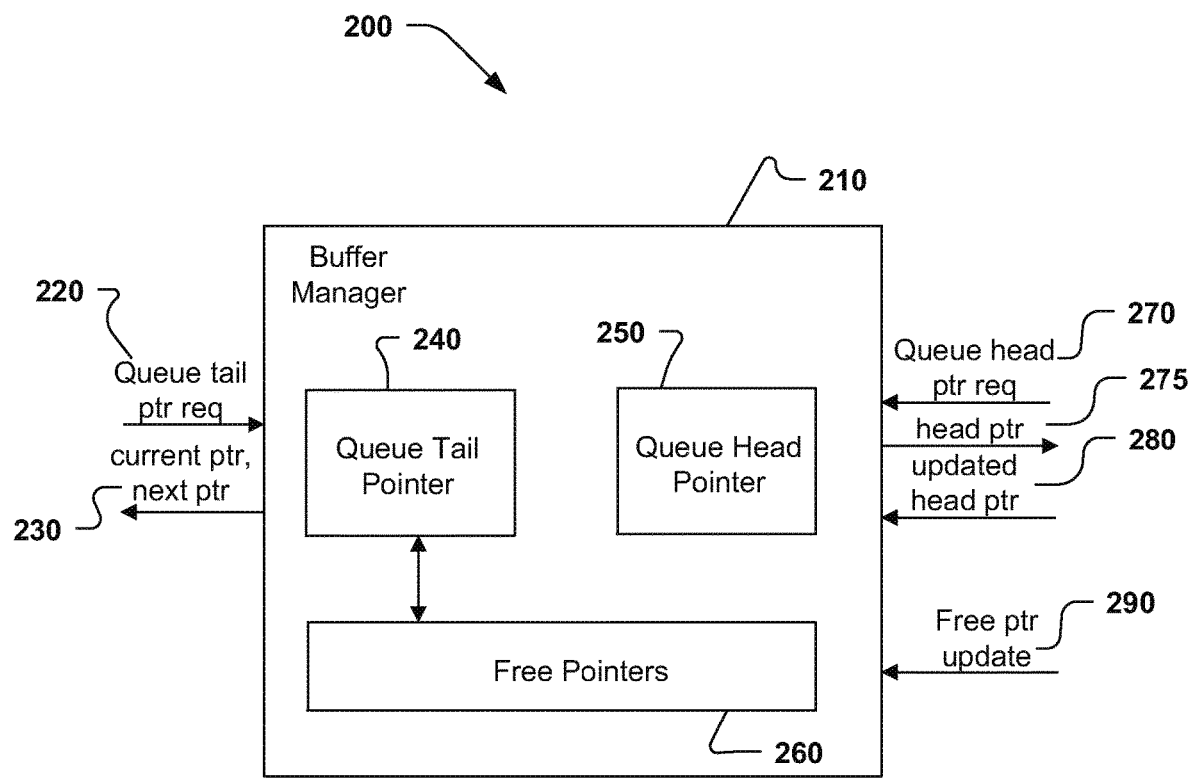
FIG. 2 is a block diagram of a buffer manager depicting the configuration of the queue tad and queue head pointers in an exemplary router in accordance with an embodiment of the present disclosure.

FIG. 2 shows a buffer memory manager 200, and queue tail pointer 40 and queue head pointer 250 and free pointers 260 of a queue memory, in the buffer manager operation 210 according to an embodiment of the present disclosure. It is to be understood that the linked list pointers 240-260 may reside and be maintained in buffer manager 130 (FIG. 1) under control of the processors 120 and 140 (FIG. 1). Every queue has both a queue head pointer 250 and a queue tail pointer 240. The queue tail pointer 240 specifies the location of a write operation and the queue head pointer 250 specifies the location of a read operation. When performing read operations, the queue head pointer 250 will shift along the queue for each new read operation. Likewise, the queue tail pointer 240 will shift along the queue for each new write operation. Hence, the last queue tail pointer 240 will identify the last write operation in a cycle and the last queue head pointer 250 will identify the last read operation for a cycle.

As shown in FIG. 2, once a particular queue is accessed according to a queue tail pointer request 220, a new queue head pointer 250 and new tail pointer 240 are read. The token of the queue is received. After the token is received, information about the next head pointer can be accessed to be read and processed.

Figure 3:
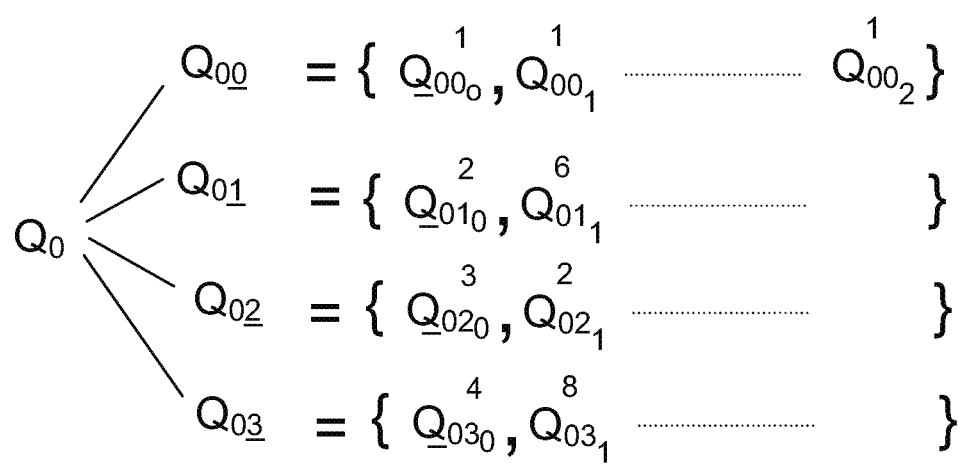
FIG. 3 illustrates an exemplary virtual queue linklist configuration in accordance with an embodiment of the present disclosure.

FIG. 3 shows the parallel link-list configurations for a selected $Q_0$ which are populated in an order according to the sequential order of the tokens received. The pointer initially requested could be a queue head pointer or a queue tail pointer. Each $Q_0$ will be divided into four (4) linked lists of $Q_{00}$ to $Q_{03}$. Hence, a $Q_0$ would be divided into four memory locations $Q_{00}$ to $Q_{03}$, each of which are the lists of $Q'_{000}$ to $Q'_{002}$ shown in FIG. 3. A single link-list of $Q_{00}$ to $Q_{03}$ is subdivided further into 4 sub-link-lists of $Q_{00}$ to $Q_{03}$. This enables, for example, one read cycle of $Q_0$ to now comprise 4 $Q_{00}$-$Q_{03}$ memory location reads or N/4 read cycles per $Q_0$ read. In other words, the linking together of additional $Q_{00}$-$Q_{03}$ for each $Q_0$ enables, in a single clocking cycle $Q_0$, the ability to receive additional token data sets that would have ordinarily be read in up to 4 cycles without the linking of the additional link-lists.

Figure 4:
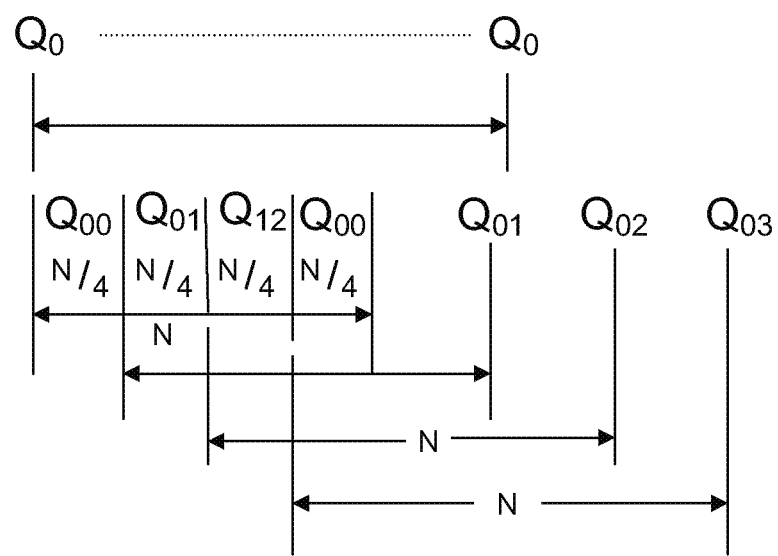
FIG. 4 illustrates an exemplary queue linklist configuration in accordance with an embodiment of the present disclosure.

FIG. 4 illustrates the read cycle for each $Q_0$, which is N/4 for $Q_{00}$. The first clocking cycle would include $Q_{00}$, $Q_{01}$, $Q_{12}$, $Q_{00}$. The next clocking cycle shifts N/4, commencing at $Q_{01}$, $Q_{12}$, $Q_{00}$, $Q_{01}$. The subsequent cycles each shift N/4 beginning with $Q_{12}$. Hence, each subsequent read and write cycle is performed by N/4 time shifts. Therefore, in a particular $Q_0$ clocking time, there are approximately up to 4 clocking register shifts of N/4, shortening the period distance of each register shift.

Figure 5A:
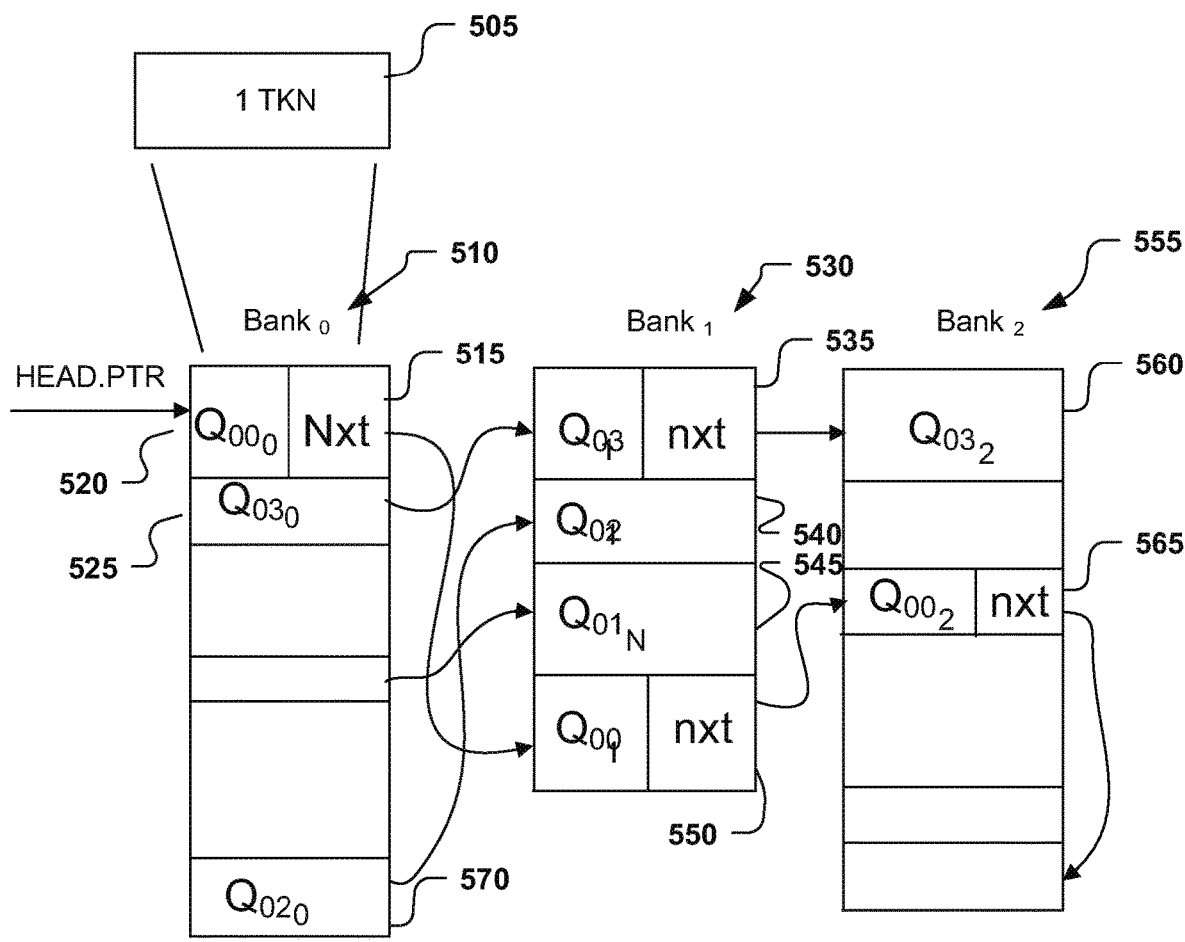
FIGS. 5A, 5B illustrate a block diagrams of exemplary head and tail pointer configuration with link-list structures in accordance with an embodiment of the present disclosure.

In FIG. 5A, after a queue is selected, a read request is executed and a token of data 505 is requested to be de-queued. A scheduler in response to the read request pops the top token of data in the selected queue. The requested token of data is placed by a buffer manager in the first available memory location of a set of memory banks, in this example, memory bank$_0$ is designated as the allocated address for the requested token of data. The head pointer 520 is selected by a link-list type manager application of the buffer manager to point to the requested token 505. The memory location is labeled $Q_{00_0}$ by the buffer manager. An internal clocking application of the buffer manager allocates tuples of 4 memory locations for the tokens of data being requested. After receiving the first token of data 505, the start-point of the first clocking cycle $Q_0$ can be ascertained. This start-point is where the initial head pointer 510 is directed and again recognized after the initial token request 505 is read and processed.

Each set of memory locations $Q_{00_N}$ is allocated up to 4 memory locations for the tokens of data being received from the selected queue. The next memory location is linked to $Q_{00_0}$ via the tail pointer 515. The buffer manager sends the next read request and receives the second token of data from the queue. The second token of data is dynamically allocated an available memory location in Bank$_1$, which is designated $Q_{00_1}$. The next pointer received 515 from the buffer manager becomes the subsequent head pointer to memory location $Q_{00_1}$. This daisy chain coupling of head and tail pointers enables a two-step process for the dequeue operation of the tokens of data from across the memory banks. As an example, the two tokens of data at the onset 515 and 550 are the initial request token of data $Q_{00_0}$ 515 and next token of data. $Q_{00_1}$ 550 that was requested from the queue. Both tokens $Q_{00_0}$ 515 and $Q_{00_1}$ 550 are de-queued in a two-step process which involves initial reading of the $Q_0$ head pointer 510 and processing token of data from the $Q_{00_0}$ location. After the processing of $Q_{00_0}$ then the next tail pointer 515 can be reads and identified by the buffer manager. That is, once $Q_0$ is requested, $Q_{00_0}$ is read; $Q_{00_0}$ and then the data associated with $Q_{00_0}$ is received, and the pathway to the next $Q_{00_1}$ is identified. From $Q_{00_1}$ the next tail pointer 550 for the pathway to $Q_{00_2}$ and subsequent next pointer 565 are also identified. Additionally, once a request $Q_0$ has transpired, then the locations for sending the set of objects or data associated with $Q_0$ are known. Additionally, FIG. 5A shows the other pathways daisy chained for the links for additional sets of tokens of data 525 and 570. The memory allocation $Q_{03_0}$ is linked to $Q_{03_1}$ and the subsequent tail pointer 535 pointing to address $Q_{03_2}$ 560 of bank$_2$. The memory list allocation 570 of Address $Q_{02_0}$ is connected to $Q_{02_1}$ 540 via its tail pointer. Additional allocations $Q_{01_N}$ 545 represents additional allocations in the memory lists in subsequent cycles.

As the buffer manager continues to send read requests, a tuple or set of 4 linked memory locations is created. Upon completion of a first set of 4 linked locations, the buffer manager begins with the next set of 4 linked locations and continues this process of creating tuples or sets of 4 memory locations until all the tokens of data are popped from the selected queue. If there is an odd number or not enough tokens of data to fill a set of 4 linked locations which may occur in the last set, to be filled, then there will be blank locations in the list.

Next, the third memory location is similarly coupled to the second memory location $Q_{00_1}$ by tail pointer 550, The tail pointer 550 is now the head pointer to the third memory location $Q_{00_2}$. The third memory location in bank$_2$ is designated by $Q_{00_2}$ and each of the memory locations is dynamically designated and allocated in a round robin or circular fashion migrating across the multiple memory banks. This round robin process continues until the entire set of 4 memory locations are created and linked by head and tail pointers. This circular loop dictates the bandwidth output for much data in a given time can be forwarded out of the identified queue or how often data from a given queue can be dequeued in a network switching algorithm. For example, in FIG. 5A, a circular configuration of $Q_{00_0}$ 515 to $Q_{00_1}$ 550 to $Q_{00_2}$ 565 is shown linking a set of memory bank lists 1 and 2. Each bank list 510, 530, 555 includes a list of tokens of $Q_{00_0}$ to $Q_{00_N}$ linked to together in pathways so that each token can be associated with a set of $Q_0$.

Figure 5B:
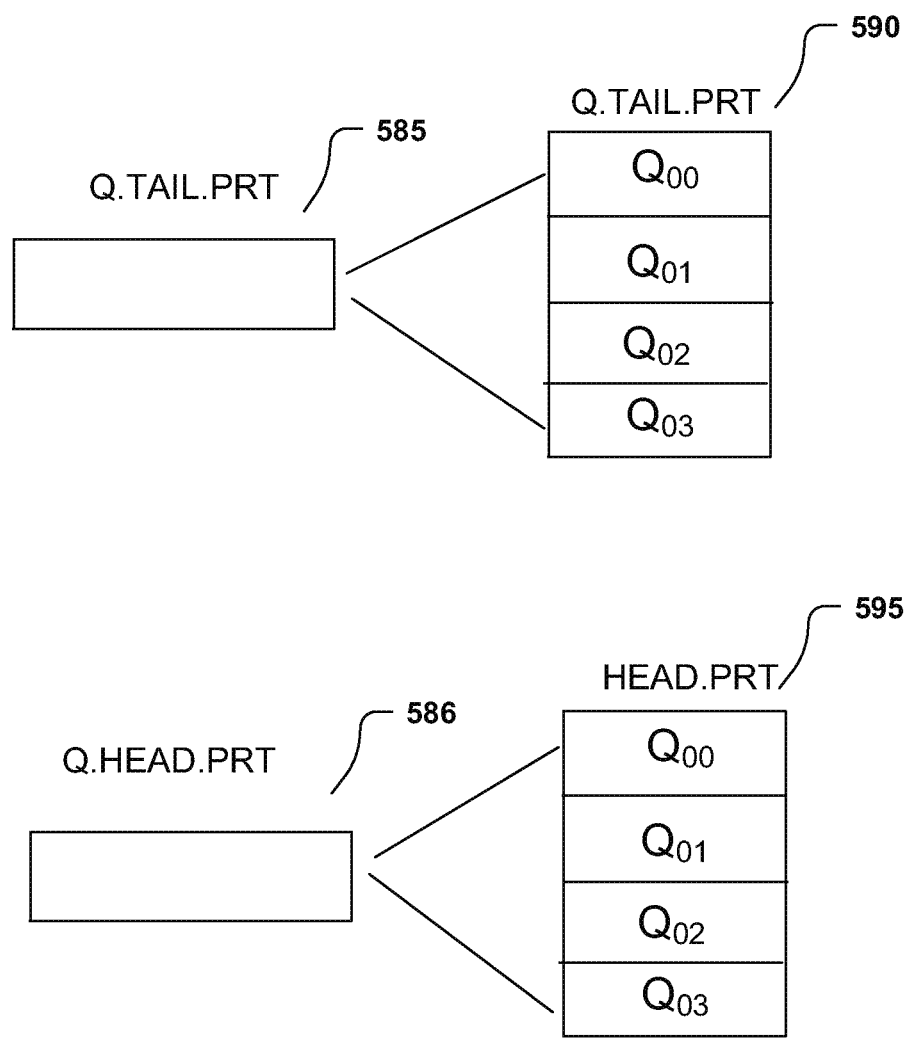

FIG. 5B illustrates in a block diagram the queue tail pointer 585 and related sub blocks of queue tail pointers 590 of $Q_{00}$ to $Q_{03}$. Also shown is a block diagram of the queue head pointer 586 and the related sub-blocks of queue head pointers 595 of $Q_{00}$ to $Q_{03}$. Each of the stacked sub blocks of queue tail pointers 590 and stacked sub blocks of queue tail pointers 595 are linked together in parallel link-lists represented in banks 1 and 2 of FIG. 5A.

Figure 6A:
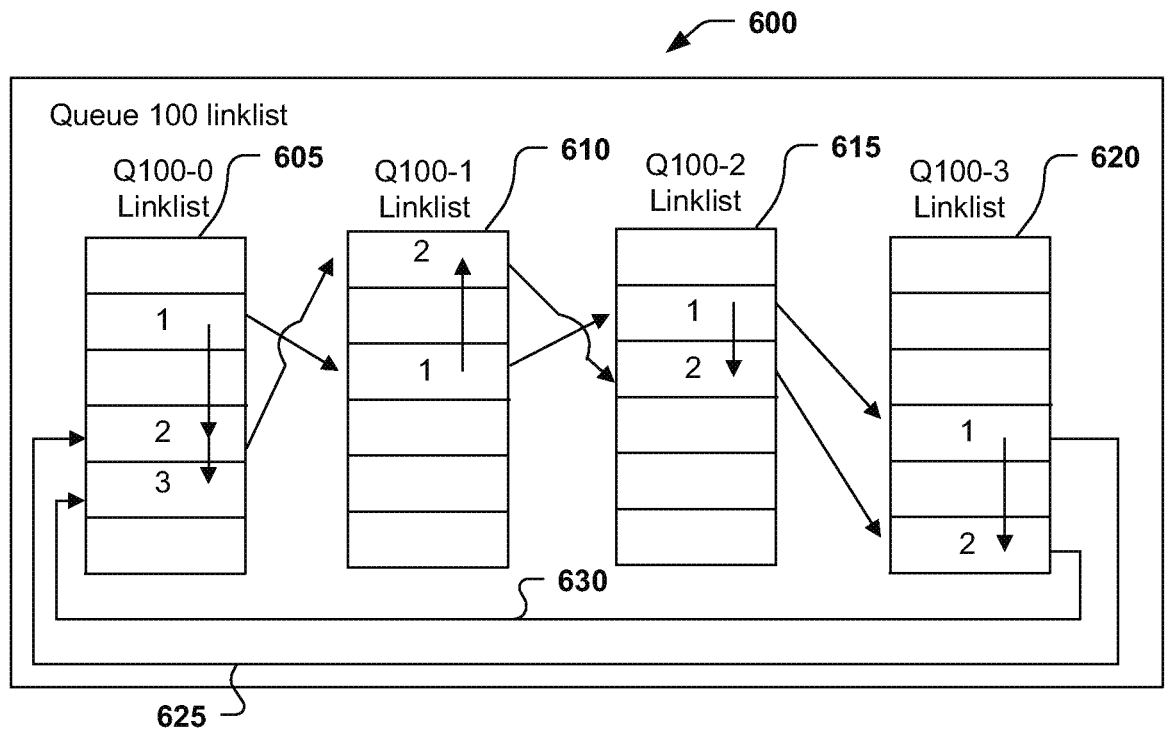
FIGS. 6A, 6B illustrate a block diagrams of the linking together of the tokens of data in the multiple memory list structures in accordance with an embodiment of the present disclosure.
Figure 6B:
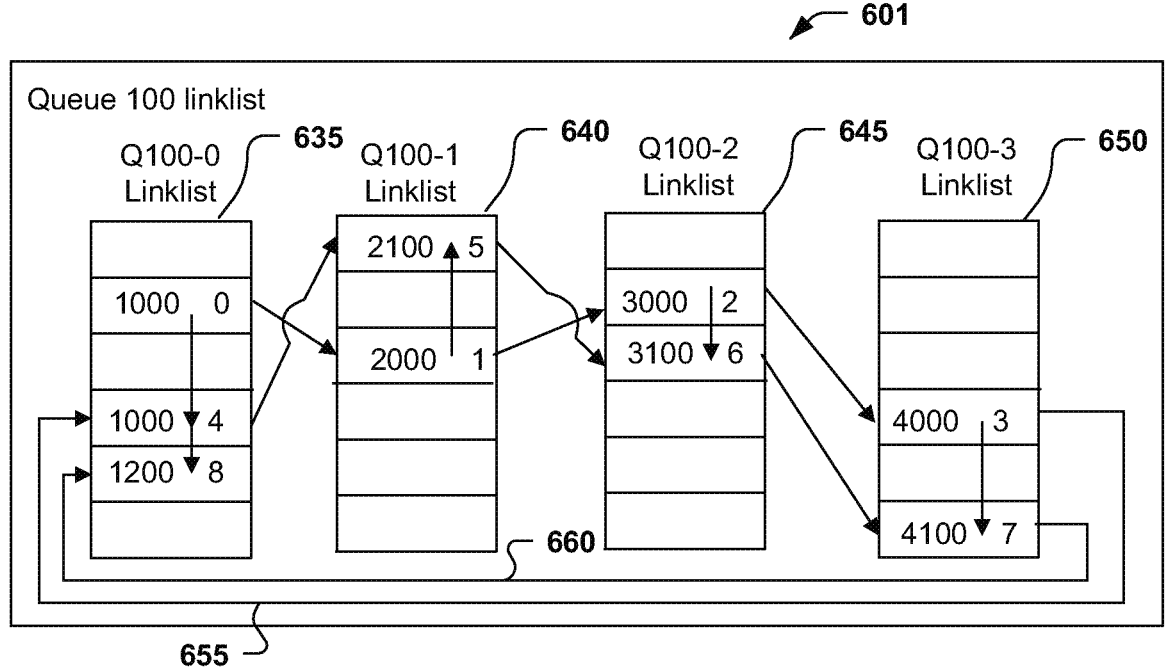

FIGS. 6A and 6B illustrate in a block diagram an example of a queue 100 parallel link-list for a single queue consisting of 4 parallel link-lists. It should be noted that the underlying concept of the exemplary embodiment(s) of the present disclosure would not change if one or more of the parallel linked lists were added or removed from the exemplary embodiment of a dynamic linked list of FIG. 6A.

FIG. 6A illustrates in a block diagram 600 an example of a queue 100 parallel link-list for a single queue 4 parallel link-lists: Q100-0 the first parallel linked list 605; Q100-1 the second parallel linked list 610; Q100-2 the third parallel linked list 615; and Q100-3 the fourth parallel linked list 620. Externally virtual couplings 625, 630 between the sub-lists of the blocks illustrate a first and second set of couplings in a loop configuration of linked lists Q100-0$_1$ to Q100-1$_1$ to Q100-2$_1$ to Q100-3$_1$ and back to Q100-0$_1$; and Q100-0$_2$ to Q100-1$_2$ to Q100-2$_2$ to Q100-3$_2$ and back to Q100-0$_2$. The couplings including tail and head pointers link together a set of 4 tokens of data with the last coupling 625, 630 serving as both the tail pointer of the last token of data in a set and the head pointer for the next token of data. The internal couplings Q100-0$_1$ to Q100-0$_2$ to Q100$_3$ represent individual parallel lists for individual token data sets in consecutive order. Hence, the last tail pointer of tokens of data set 1 is connected to the next token of data set 2 and the last tail pointer of set 1 serves as the first head pointer of tokens of data set 2, In the example of FIG. 6A, because there are two complete sets of tokens of data of linked lists Q100-0$_1$ to Q100-1$_1$ to Q100-2$_1$ to Q100-3$_1$ and Q100-1$_2$ to Q100-2$_2$ to Q100-3$_2$ and back to Q100-0$_2$, there are two head pointers generated by the tail pointers 525 and 630 to the tokens of data sets 2 and 3.

Additionally, in FIG. 6A the overall link-list round robin type cycle or loop process of enqueuing and populating the memory list, allocations and de-queuing multiple sets of memory allocations of the 4 tokens of data of a set is shown. The coupling of the first set of 4 tokens of data between sub-lists 605, 610, 615, 620 are designated as "1-1-1-1" in FIG. 6A. The buffer manager relies on an internal counter application to track each set of 4 and a virtual table is created in buffer memory to store all the counter values with the associated head and tail pointers. Additionally, the tokens of data can have additional pointers associated with additional data sets for each of the sets of 4 in the sub-lists allowing for data storage at external locations. Upon completion of the initial set of 4, the buffer manager increments its internal counter and designates the next set "2-2-2-2". This process is repeated until all tokens of data from the selected queue are enqueued or dequeued. The buffer manager using internal counter applications follows a FIFO type ordering of the blocks of sets of 4 and each set is further coupled in numerical order of sets of 1-2-3 as shown in the example of FIG. 6A.

FIG. 6B illustrates in a block diagram an example of a queue list generated for a particular destination (not shown) in a port 4 and traffic class 4, of queue 100, There are shown parallel memory sub-lists 635, 640, 645, and 650. For example, the queue tail pointer memory for Q100 is Q100-0 in memory sub-list 635 which is given as the current pointer 1000. Also, the free pointer read from memory is 1100 and is written to queue tail memory for queue 100-0. Hence for the queue tail memory for Q100-0 has a current pointer of 1000 and a next pointer of 1100. It is also shown in Table 1.1 below that lists each of the "Qtail Req" with its current pointer and next pointer. Each of these queue tail requests and current and next pointer makes up internal parallel link-lists. The memory allocations in Q100-0 are random and dynamically selected on availability, Hence, the ordering in the memory list is changed upon availability of memory locations. A dynamic list generated is shown in Table 1.1 below, where during the enqueuer process, the buffer manager allocates for the first set of 4 of tokens of data a current pointer 1000 and then next pointer 1100 for the next set of 4 of tokens of data. An internal counter is shown in the FIG. 6B of the tail pointer 1000 and the counter 0. The next pointer for the token of data in the first set is shown by a coupling of a tail pointer from 1000-0 to 2000-1. The counter is update to 1 and the current pointer in the sub list Q100-1 is 2000. In sublist Q100-2, the current pointer is 3000 with the counter 2 and in sub list Q100-3, the current pointer is 4000 with counter 3. Each of the sub lists 635-650 is allocated with current pointers as the buffer manager migrates to each list and updates its internal counter creating a set of head and tail pointers for each set of 4 tokens of data. After migrating through each of the sub-lists, the buffer manager returns 655, 660 with a free pointer as the next current pointer for the next set of tokens of data. Using, this circular or round robin approach, all the sub-lists are utilized for storing the tokens of data in sets of 4 and the last tail pointer of each set becomes the subsequent head pointer of the next set. Therefore, the counter values of the initial Q100-0 link-list 635 are designated in sets of 4 of 0, 4, 8, etc., corresponding to sets of pointers allocated to each set of tokens of data.

TABLE 1.1

Enqueue and Buffer Manager Interaction

Qtail Req-100-0->current pointer-1000, next pointer -1100
Qtail Req-100-1->current pointer-2000, next pointer -2100
Qtail Req-100-2->current pointer-3000, next pointer -3100
Qtail Req-100-3->current pointer-4000, next pointer -4100
Qtail Req-100-4->current pointer-1100, next pointer -1200
Qtail Req-100-5->current pointer-2100, next pointer -2200
Qtail Req-100-6->current pointer-3100, next pointer -3200
Qtail Req-100-7->current pointer-4100, next pointer -4200
Qtail Req-100-8->current pointer-1200, next pointer -1300

Figure 7:
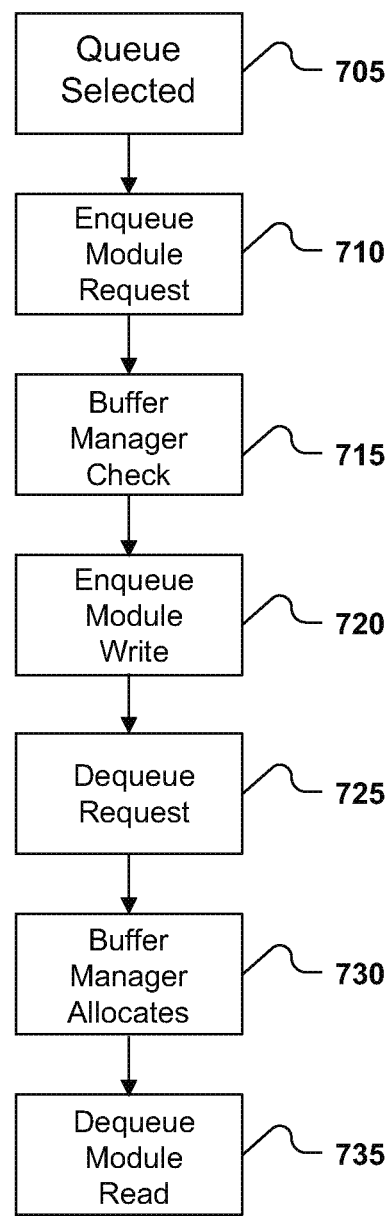
FIG. 7 is a flowchart showing an exemplary buffer manager operation with the link-list structures in accordance with an embodiment of the present disclosure.

FIG. 7 is a flowchart illustrating an exemplary process performed by the buffer manager operation of FIG. 2. Further, a representation of continuous packet traffic for the queue 100 according to the steps of the flowchart of FIG. 7. At step 705, a queue is selected based upon the destination port and class of traffic associated with the data. In step 710, the enqueue module 120 (of FIG. 1) requests the buffer manager 130 (of FIG. 1) for the pointer to store the data in the buffer memory 150 (of FIG. 1). For example, with respect to the identified queue 100 in FIGS. 6A and 6B the enqueue module would request pointer locations for queue 100, In Step 715, the buffer manager checks the queue tail pointer memory for the identified queue and sets the current pointer to his location. Additionally, the buffer manager pops up an additional one free pointer from the free pointer memory and writes this into the queue tail pointer memory and also identifies this free pointer as the next pointer to the enqueue module.

In step 720, the enqueue module uses the current pointer to write the token and next location in the buffer memory. The enqueue module uses location 1000 to write the token and 1100 as the next memory location as shown in Table 1.1. Additionally, for the next queue tail request 100-1; the enqueue module uses the current pointer at memory location 3000 and the next pointer is at memory location 3100. Table 1.1 illustrates the subsequent queue tail requests and current pointer and next pointer locations.

In step 725, after a queue is scheduled to be dequeued, the dequeue module requests the queue head pointer for the queue from the buffer manager. As an example, once queue 100 is scheduled to be dequeued, the dequeue module requests for head pointer 1000 for queue 100 to be sent to the buffer manager. As shown in Table 1.2, in Step 730, the buffer manager allocates the head pointer value 1000 for the requested queue.

Step 735 illustrates the dequeue module operation when the dequeue module reads the packet and next pointer from the buffer memory and then forwards the next pointer as the head pointer update to the buffer manager. The dequeue module will read from location 1000 in the buffer from where it receives the token and next pointer 1100. The dequeue module sends 1100 as head pointer update request for queue 100. Pointer 1000 is now the free pointer and the dequeue module forwards the free pointer to the buffer manager. (See Table 1.2 for dequeue operation below.)

TABLE 1.2

Dequeue and Buffer Manager Interaction

Head Req-100->head pointer -1000
Head update-1100
Head Req-101->head pointer -2000
Head update-2100
Head Req-102->head pointer -3000
Head update-3100
Head Req-103->head pointer -4000
Head update-4100
Head Req-100->head pointer -1100
Head update-1200
Head Req-101->head pointer -2100
Head update-2200
Head Req-102->head pointer -3100
Head update-3200
Head Req-103->head pointer -4100
Head update-4200
Head Req-100->head pointer -1200
Head update-1300

When the dequeue module commences a scheduled dequeue operation of queue 100, the operation is performed by a scheduler in 4 clocking cycles each $Q_0$ split equally across the multiple queues. The scheduler requests the head pointer information of queue 100, 101, 102, and 103 sequentially, so as to perform the dequeuer operation in the priority of the scheduler requests. The overall $Q_0$ when dequeuing the queue is performed by the scheduler in the scheduled queue 100 every 4 clocks which can be viewed as the $Q_0$ of accessing data linked together over 4 different parallel link-lists. As a result, for every individual parallel link-list, the dequeue operation can occur up to a maximum speed of 16 clocks in a cycle. As per requirement of through-put and latency limitations the parallel link-list dequeuing can be increased from 4 to 8 and upward.

Figure 8:
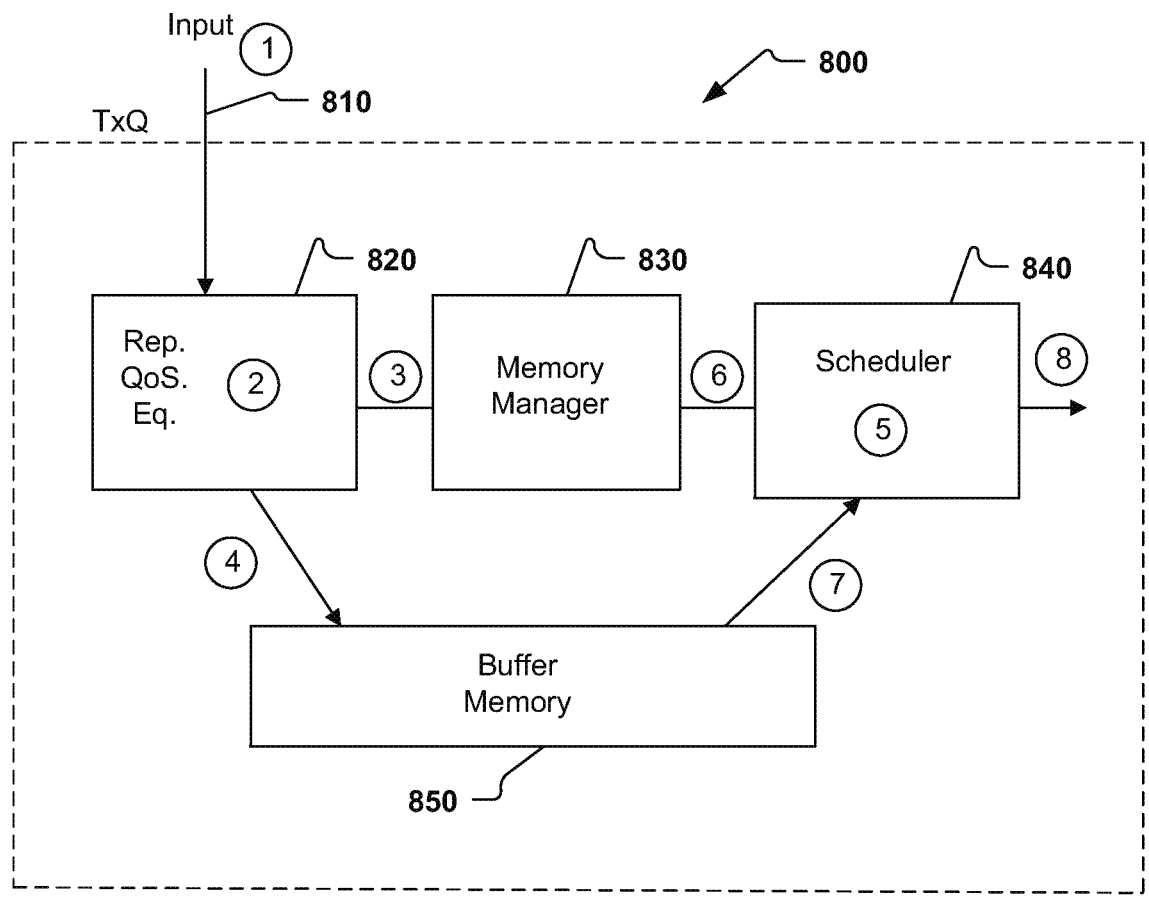
FIG. 8 is a block diagram of an exemplary buffer manager depicting the configuration of the queue tail and queue head pointers in an exemplary router in accordance with an embodiment of the present disclosure.

FIG. 8 is a block diagram similar to FIG. 2 but illustrates the steps of the enqueuing and de-queuing operations. In FIG. 8, incoming tokens (1) are received to be classified by en-queue module 820. Next, output (3) requests a new queue tail pointer from the buffer memory 830. The queue tail memory for the parallel link-list (2) is sent to the memory (4) for a write operation into the buffer memory 850, The token data is written into the buffer memory 850. The scheduler 840 chooses a $Q(Q_0)$ (5) and request queue head pointer (6) for the parallel link-list. The buffer manager reads the queue head pointer and uses this head pointer as the updated head pointer and then writes the updated head pointer to the parallel link-list.

Figure 9:
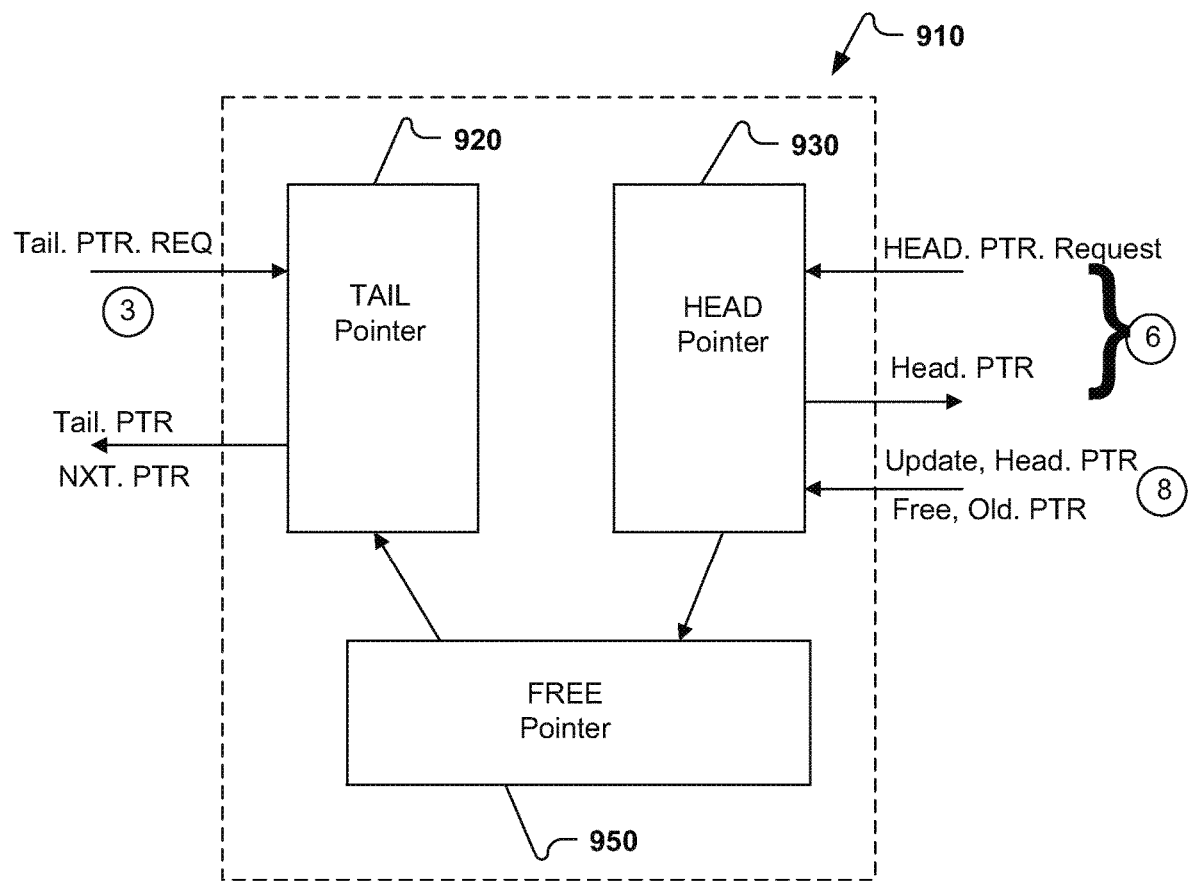
FIG. 9 is a block diagram depicting a configuration of the buffer manager modules in an exemplary router, in accordance with the present disclosure.

FIG. 9 is an illustration an exemplary process performed by a buffer manager when an incoming token is received and classified to a $Q_0$ according to an embodiment of the present disclosure. A request for a new queue tail pointer (3) is sent to queue tail pointer module 920. Queue tail pointers for the parallel link-list are generated with each request and when the token is received a write operation is performed for the token into the buffer memory. For the scheduler operation, when the $Q_0$ is chosen, a request is made for a queue head pointer (6) to be sent to the queue head pointer module 930. The queue head pointers for the parallel link-list are sent from each of the parallel link-lists. The requested queue head pointer is read and the token associated with the head pointer is forwarded out (8) with the queue updated head pointer and the now free old pointer.

Accordingly, as shown by exemplary embodiments of the present disclosure, by linking together 4 parallel sub link-list, enqueue and dequeue operations read write operations are minimized in a given N period for a selected $Q_0$. In addition, the routing process according to the present disclosure advantageously oilers increased thorough-put for limited buffer space allocation for the enqueue and dequeue operations thereby reducing latency time experienced at this bottleneck operational step by the buffer manager. By dividing queue allocations into multiple virtual sub-queue lists for enqueuing and dequeueing, the tokens of data can be retrieved and transmitted faster without significant changes in the physical buffer configurations while reducing the overall latency times incurred in such enqueuing and dequeuing operations.

It will be appreciated that the circuitry in the router can be implemented as application specific integrated circuits (ASIC), application-specific standard parts (ASSPs), System-on-Chip (SoC), field-programmable gate arrays (FPGAs), etc. Further, it will be appreciated that the router may include various other functions and components that are well known in the art.

Although certain preferred embodiments and methods have been disclosed herein, it will be apparent from the foregoing disclosure to those skilled in the art that variations and modifications of such embodiments and methods may be made without departing from the spirit and scope of the disclosure, is intended that the disclosure shall be limited only to the extent required by the appended claims and the rules and principles of applicable law.

What is claimed is:

1. A method performed by a buffer manager to queue data to a memory buffer, the method comprising:
receiving a request for addresses and pointers for addresses allocated by the buffer manager, for storing a set of tokens of data from a queue selected from a plurality of queues, wherein the set of tokens of data comprises more than two tokens of data;
accessing a memory list, and generating the addresses and the pointers to allocated addresses in the memory list, wherein the memory list comprises more than two parallel linked memory lists;
writing the pointers for the allocated addresses into the memory list to form a set of more than two linked memory locations, wherein each memory location of the set of more than two linked memory locations is allocated in a distinct parallel linked memory list in the more than two parallel linked memory lists, wherein the pointers externally link together each memory location of the set of more than two linked memory locations, and wherein each of the more than two parallel linked memory lists is divided into more than two memory locations; and
migrating to another set of more than two linked memory locations for additional address allocations upon receipt of another set of tokens of data from the queue, and generating additional pointers linking together memory locations of the other set of more than two linked memory locations.

2. The method of claim 1, further comprising generating tail pointers and head pointers that link more than two allocated addresses of the set of tokens of data across the more than two parallel linked memory lists.

3. The method of claim 1, wherein the buffer manager is coupled to an enqueue processor operable for enqueuing the set of tokens of data into the allocated addresses of the more than two parallel linked memory lists, and is also coupled to a dequeue module operable for dequeuing the set of tokens of data from the allocated addresses of the more than two parallel linked memory lists.

4. The method of claim 3, further comprising receiving requests from the enqueue processor to enqueue the more than two tokens of data, wherein the more than two tokens of data have addresses linked by pointers across the more than two parallel linked memory lists.

5. The method of claim 3, further comprising receiving requests from the dequeue module to dequeue the more than two tokens of data, wherein the more than two tokens of data have addresses linked by pointers across the more than two parallel linked memory lists.

6. The method of claim 1, further comprising populating the more than two parallel linked memory lists for the additional address allocations according to address availability.

7. The method of claim 6, wherein said populating is performed in a round robin manner consecutively across each of the distinct parallel linked memory lists until all the requested addresses are allocated.

8. A system, comprising:
a memory buffer; and
a buffer manager coupled to the memory buffer, the buffer manager configured to:
receive a request for addresses and pointers for addresses allocated by the buffer manager, for storing a set of tokens of data from a queue selected from a plurality of queues, wherein the set of tokens of data comprises more than two tokens of data;
access a memory list, and generate the addresses and the pointers to allocated addresses in the memory list, wherein the memory list comprises more than two parallel linked memory lists;
write the pointers for the allocated addresses into the memory list to form a set of more than two linked memory locations, wherein each memory location of the set of more than two linked memory locations is allocated in a distinct parallel linked memory list in the more than two parallel linked memory lists, wherein the pointers externally link together each memory location of the set of more than two linked memory locations, and wherein each of the more than two parallel linked memory lists is divided into more than two memory locations; and
migrate to another set of more than two linked memory locations for additional address allocations upon receipt of another set of tokens of data from the queue, and generate additional pointers linking together memory locations of the other set of more than two linked memory locations.

9. The system of claim 8, wherein the more than two parallel linked memory lists comprise a first memory list, a second memory list, a third memory list, and a fourth memory list, linked in parallel.

10. The system of claim 8, wherein more than two allocated addresses of the set of tokens of data are linked by tail pointers and head pointers across the more than two parallel linked memory lists.

11. The system of claim 8, further comprising an enqueue processor configured to: enqueue the set of tokens of data into the allocated addresses of the more than two parallel linked memory lists, and generate requests to the buffer manager for enqueuing the more than two tokens of data; and wherein the more than two tokens of data have addresses linked by pointers across the more than two parallel linked memory lists.

12. The system of claim 8, further comprising a dequeue module configured to: dequeue the set of tokens of data from the allocated addresses of the more than two parallel linked memory lists, and generate requests to the buffer manager for dequeuing the more than two tokens of data; and wherein the more than two tokens of data have addresses linked by pointers across the more than two parallel linked memory lists.

13. The system of claim 8, wherein the more than two parallel linked memory lists for the additional address allocations are dynamically populated according to address availability.

14. The system of claim 13, wherein the more than two parallel linked memory lists are populated in a round robin manner consecutively across each of the distinct parallel linked memory lists until all the requested addresses are allocated.

15. A data processing system, comprising:
at least one processor operable for enqueuing a set of tokens of data into a memory list and for dequeuing the set of tokens of data from the allocated addresses of the parallel linked memory lists, wherein the set of tokens of data comprises more than two tokens of data, and Wherein the memory list comprises more than two parallel linked memory lists; and a buffer manager coupled to the at least one processor, the buffer manager operable for performing a method to queue data to a memory buffer, the method comprising:

receiving a request for addresses and pointers for addresses allocated by the buffer manager, for storing the set of tokens of data;

accessing the memory list, and generating the addresses and the pointers to allocated addresses in the memory list;

writing the pointers for the allocated addresses into the memory list to form a set of more than two linked memory locations, wherein each memory location of the set of more than two linked memory locations is allocated in a distinct parallel linked memory list in the more than two parallel linked memory lists, wherein the pointers externally link together each memory location of the set of more than two linked memory locations, and wherein each of the more than two parallel linked memory lists is divided into more than two memory locations; and migrating to another set of more than two linked memory locations for additional address allocations upon receipt of another set of tokens of data, and generating additional pointers linking together memory locations of the other set of more than two linked memory locations.

16. The data processing system of claim 15, wherein the more than two parallel linked memory lists comprise a first memory list, a second memory list, a third memory list, and a fourth memory list, linked in parallel.

17. The data processing system of claim 15, wherein more than two allocated addresses of the set of tokens of data are linked by tail pointers and head pointers across the more than two parallel linked memory lists.

18. The data processing system of claim 15, further comprising an enqueue processor configured to: enqueue the set of tokens of data into the allocated addresses of the more than two parallel linked memory lists, and generate requests to the buffer manager for enqueuing the more than two tokens of data; and wherein the more than two tokens of data have addresses linked by pointers across the more than two parallel linked memory lists.

19. The data processing system of claim 15, further comprising a dequeue module configured to: dequeue the set of tokens of data from the allocated addresses of the more than two parallel linked memory lists, and generate requests to the buffer manager for dequeuing the more than two tokens of data; and wherein the more than two tokens of data have addresses linked by pointers across the more than two parallel linked memory lists.

20. The data processing system of claim 15, wherein the more than two parallel linked memory lists for the additional address allocations are dynamically populated according to address availability, and wherein the more than two parallel linked memory lists are populated in a round robin manner consecutively across each of the distinct parallel linked memory lists until all the requested addresses are allocated.

* * * * *